(12) United States Patent
Hellstrom et al.

(10) Patent No.: US 10,920,705 B2
(45) Date of Patent: Feb. 16, 2021

(54) METHOD AND SYSTEM FOR VARIABLE DISPLACEMENT ENGINE

(71) Applicant: Ford Global Technologies, LLC, Dearborn, MI (US)

(72) Inventors: John Erik Mikael Hellstrom, Ann Arbor, MI (US); Bradley Dean Riedle, Northville, MI (US); Stuart N. Ford, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 16/440,769

(22) Filed: Jun. 13, 2019

(65) Prior Publication Data

US 2020/0392916 A1 Dec. 17, 2020

(51) Int. Cl.
| F02D 41/22 | (2006.01) |
| F02D 41/14 | (2006.01) |
| F02D 41/00 | (2006.01) |

(52) U.S. Cl.
CPC ..... *F02D 41/1495* (2013.01); *F02D 41/0002* (2013.01); *F02D 41/22* (2013.01); *F02D 2041/0012* (2013.01)

(58) Field of Classification Search
None
See application file for complete search history.

(56) References Cited

U.S. PATENT DOCUMENTS

| 4,585,101 | A | * | 4/1986 | Danno | B60W 10/06 123/198 F |
| 5,334,923 | A | | 8/1994 | Lorenz et al. | |
| 5,374,224 | A | * | 12/1994 | Huffmaster | F02D 41/0087 477/181 |
| 6,565,483 | B2 | * | 5/2003 | Segawa | F16H 61/143 477/174 |
| 6,843,752 | B2 | * | 1/2005 | Bolander | F02D 17/02 477/54 |
| 7,072,758 | B2 | | 7/2006 | Kolmanovsky et al. | |
| 7,288,046 | B2 | * | 10/2007 | Boone | F16H 61/48 477/106 |
| 7,785,230 | B2 | * | 8/2010 | Gibson | B60W 30/20 477/62 |
| 8,979,708 | B2 | * | 3/2015 | Burtch | F16D 48/06 477/168 |
| 9,174,645 | B2 | * | 11/2015 | Beechie | B60W 30/18027 |
| 9,249,748 | B2 | | 2/2016 | Verner | |
| 10,202,917 | B1 | | 2/2019 | Hellstrom et al. | |

(Continued)

FOREIGN PATENT DOCUMENTS

JP 2008278702 A 11/2008

*Primary Examiner* — Dirk Wright
(74) *Attorney, Agent, or Firm* — Geoffrey Brumbaugh; McCoy Russell LLP

(57) ABSTRACT

Methods and systems are provided for reduction of VDE harmonics and improvement in the phase alignment of powertrain sensor signals that are asynchronously tasked. In one example, torque converter slip control is improved in a variable displacement engine by processing a raw torque converter turbine speed signal with a moving average filtered engine speed signal. By determining an actual delay between the sampled signals and adjusting a downstream filter parameter, a desired delay can be provided between the samples to align the phases and reduce the signal harmonics.

20 Claims, 5 Drawing Sheets

(56) References Cited

U.S. PATENT DOCUMENTS

| | | |
|---|---|---|
| 10,221,786 B2 | 3/2019 | Serrano et al. |
| 10,221,787 B2 * | 3/2019 | Banker .................. F02D 17/02 |
| 10,233,852 B2 | 3/2019 | Karnik et al. |
| 10,578,037 B2 * | 3/2020 | Nagashima ......... F02D 41/3058 |
| 10,711,715 B2 * | 7/2020 | Glugla ................... F02D 13/06 |
| 2014/0194247 A1 | 7/2014 | Burtch |
| 2016/0276971 A1 | 9/2016 | Thyagarajan et al. |

* cited by examiner

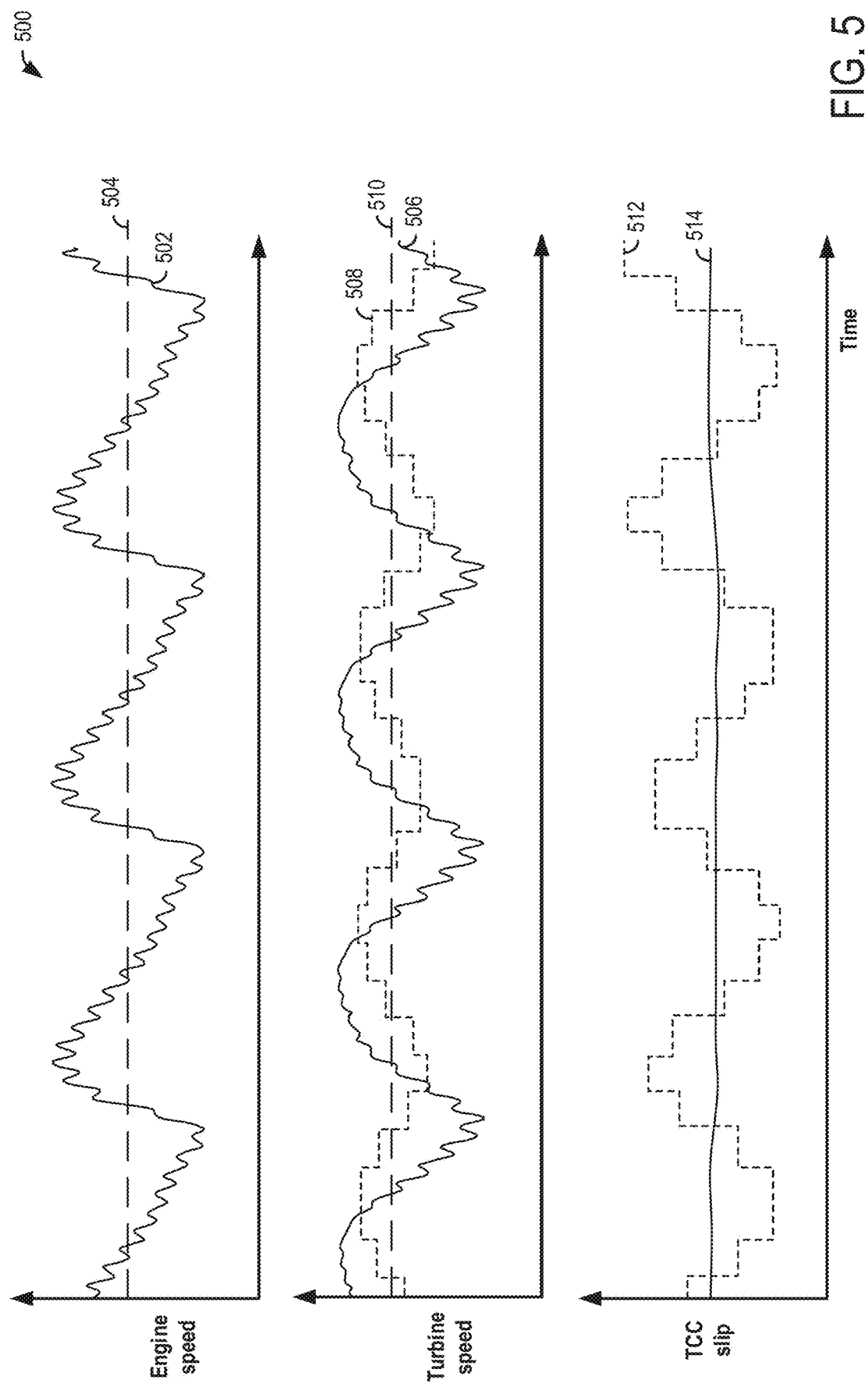

METHOD AND SYSTEM FOR VARIABLE DISPLACEMENT ENGINE

FIELD

The present description relates generally to methods and systems for processing signals generated on a variable displacement engine to reduce NVH.

BACKGROUND/SUMMARY

Vehicles may be powered with internal combustion engines wherein the combustion process generates undesired noise, vibration and harshness (NVH). Transfer of NVH from the engine compartment of the vehicle to the passenger compartment can result in discomfort to vehicle occupants, and reduce their drive quality. Various engine components can generate the NVH, such as the firing cylinders, cams, exhaust system components, etc. In a variable displacement engine, which can be operated with a reduced set of active cylinders, cylinders are equipped with deactivation mechanisms that can change the active/inactive state of cylinders on each engine cycle. To provide a given induction ratio, which controls the effective displacement of the engine, cylinders are fired or skipped in a defined sequence. The sequence and identity of cylinders that are fired or skipped also affects overall engine NVH.

In addition to the various engine components, many signals captured at the engine (such as intake pressure, air flow, engine speed, cam timing, etc.) have frequency components that are tied to an engine cycle frequency and can generate harmonics. It may be desirable to reduce such harmonics so as to reduce the overall vehicle NVH. As an example, an engine control system may sense engine intake manifold pressure to determine engine operating parameters that are a basis for adjusting engine actuators. The sampled engine intake manifold pressure may be used along with engine speed to estimate an amount of air flowing through the engine using the ideal gas law. Once engine air flow is known, a desired amount of fuel that provides a desired engine air-fuel ratio may be determined. However, frequencies in the engine intake manifold pressure may cause intake manifold pressure to exhibit a standard deviation that is larger than desired. If the engine fuel amount were adjusted responsive to the raw (e.g., unfiltered) engine intake manifold pressure sampled at a slow rate and at fixed crankshaft intervals, the engine's air-fuel ratio may vary more than is desired.

One example approach for reducing the harmonics is shown by Hellstrom et al in U.S. Pat. No. 10,202,917. Therein, coefficients of a finite impulse response filter are adjusted responsive to changes in engine induction ratio so that undesirable frequencies output from engine sensors may be attenuated. Still other approaches includes low-pass filtering the signals. For example, the engine controller may apply a low pass filter to a MAP signal and sample the MAP signal at a rate that is an integer multiple of engine firing frequency. The filtered MAP may then be used to determine an amount of fuel to inject to the engine.

However, the inventors herein have recognized potential issues with such systems. As one example, in modern vehicle software architecture, computations may be distributed across execution tasks running at different sample rates as well as across different processing modules. A task may thus be dependent on data from another task running asynchronously at a different rate. For example, during torque converter slip control, slip above the torque converter coupling point provides torsional damping through the torque converter fluid torque path while minimizing losses due to excess slip. The slip is the difference between the engine speed and the transmission turbine speed. Typically, the engine speed is calculated in a task with a rate tied to rotation frequency while the turbine speed and control logic runs in a task with a time-based rate. As a result, there may be a phase misalignment between the engine and transmission calculations. In addition, the calculations may even be in different modules. As a result, torque converter slip control may be challenging.

As another example, low-pass filtering of signals may compromise the dynamic signal response and reduce the maximum regulation bandwidth. For example, in a VDE engine, where the actual total number of active cylinders changes from engine cycle to engine cycle, processing a MAP sensor signal via a first order low pass filter and a constant sampling frequency may not provide a filtered MAP sensor signal that is suitable for controlling engine fuel injection because frequencies within the MAP sensor signal dynamically change while poles of the first order filter remain constant.

In one example, the issues described above may be addressed by a method for phase aligning signals in a multi-rate system. One example method comprises, while operating an engine with one or more cylinders selectively deactivated, calculating torque converter lock-up clutch (TCC) slip by filtering a plurality of powertrain input signals using filter parameters adjusted based on a current induction ratio to align a phase of the plurality of input signals. In this way, torque converter slip is estimated by filtering input signals using filter parameters adjusted based on a current induction ratio to align a phase of the input signals. The torque converter is then regulated with the goal of achieving the estimated torque converter slip equal to a desired level of slip, which is set by defined constraints, such as NVH considerations.

The present description may provide several advantages. Specifically, harmonics may be better suppressed by tuning the phase delay of one signal to better match another asynchronous signal. In addition, fuel economy is improved because improved filtering makes it possible to run the powertrain in more efficient modes with an acceptable level of NVH. Further, the approach may be applied to a variety of different engines having different cylinder configurations. The technical effect of improving torque converter slip regulation via phase alignment with other engine signals is that the quality of a feedback signal is improved, giving the engine controller an opportunity for increased controller bandwidth and control performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 5 is a graphic representation of signals filtered and phase aligned according to the present disclosure.

DETAILED DESCRIPTION

Figure 1:
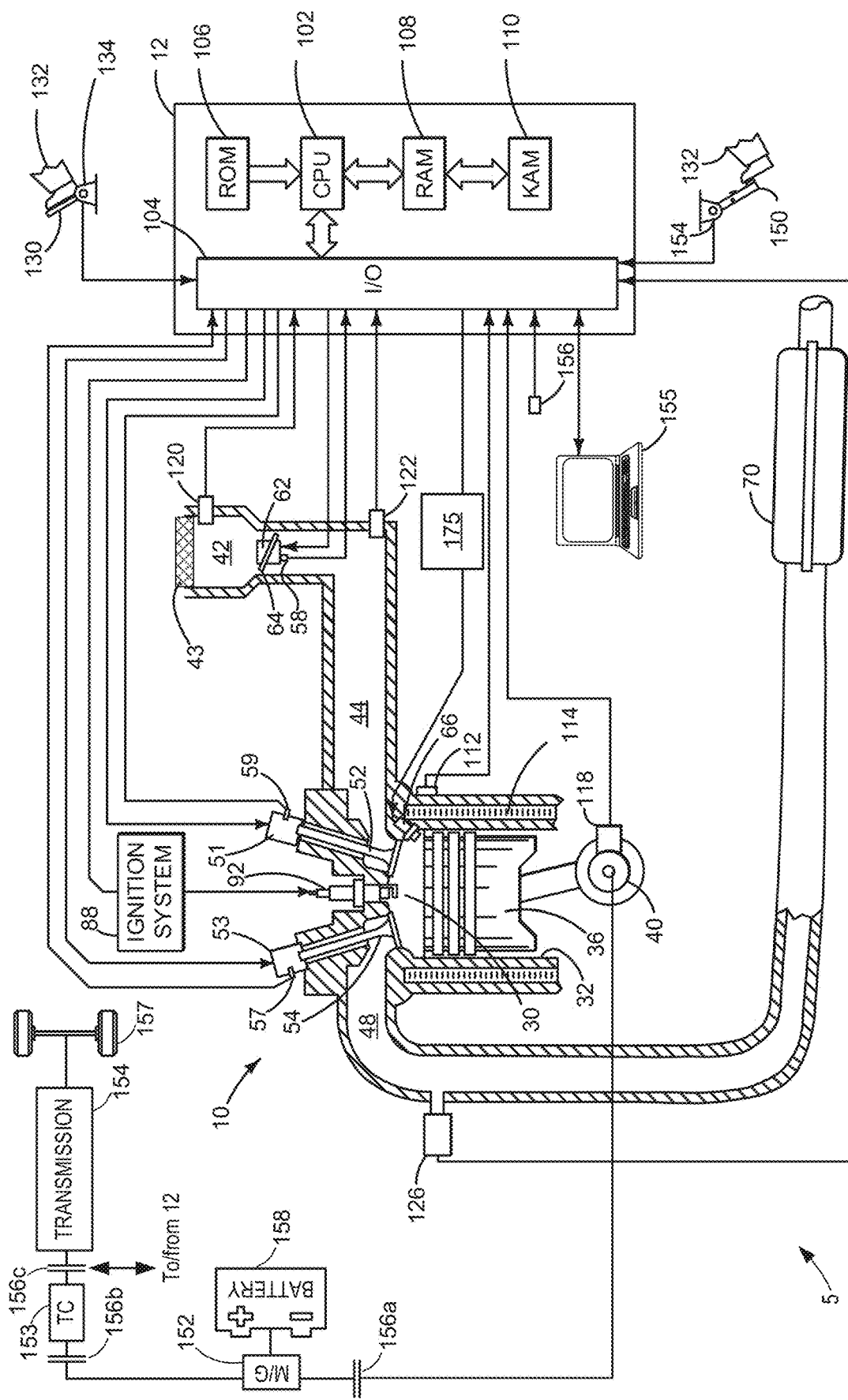
FIG. 1 is a schematic diagram of an engine.
Figure 2A:
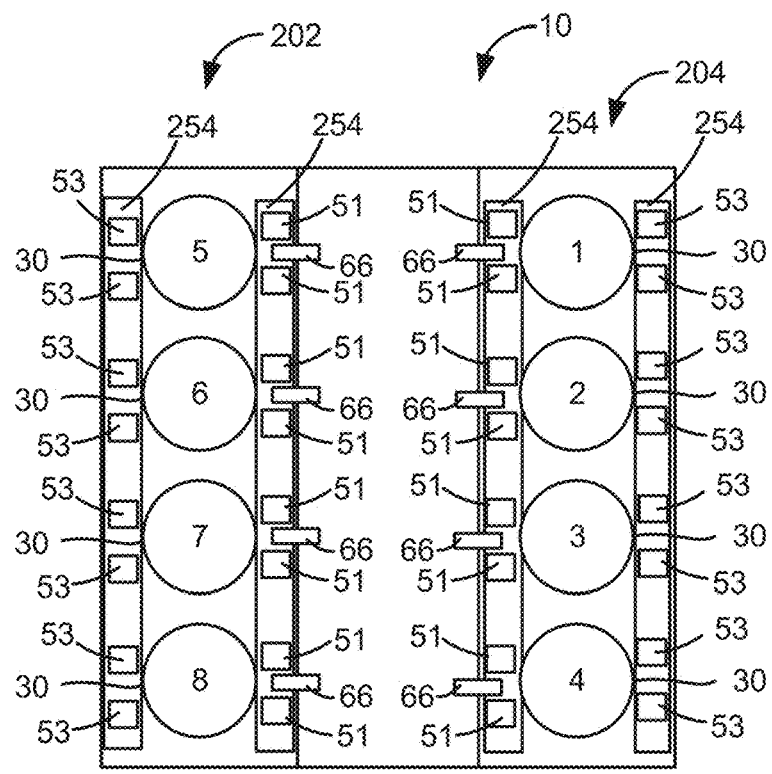
FIG. 2A is a schematic diagram of an eight cylinder engine with two cylinder banks.
Figure 2B:
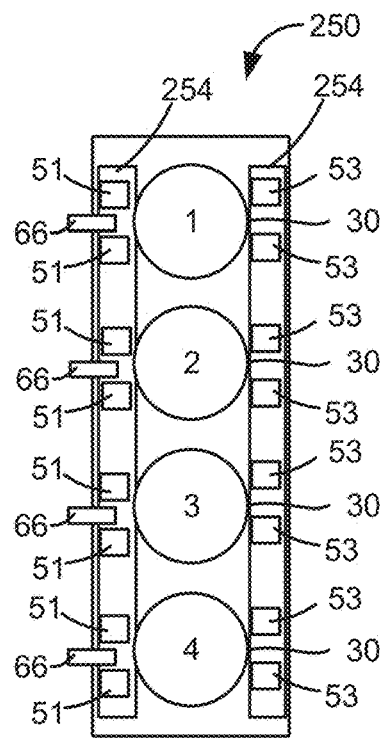
FIG. 2B is a schematic diagram of a four cylinder engine with a single cylinder bank.
Figure 3:
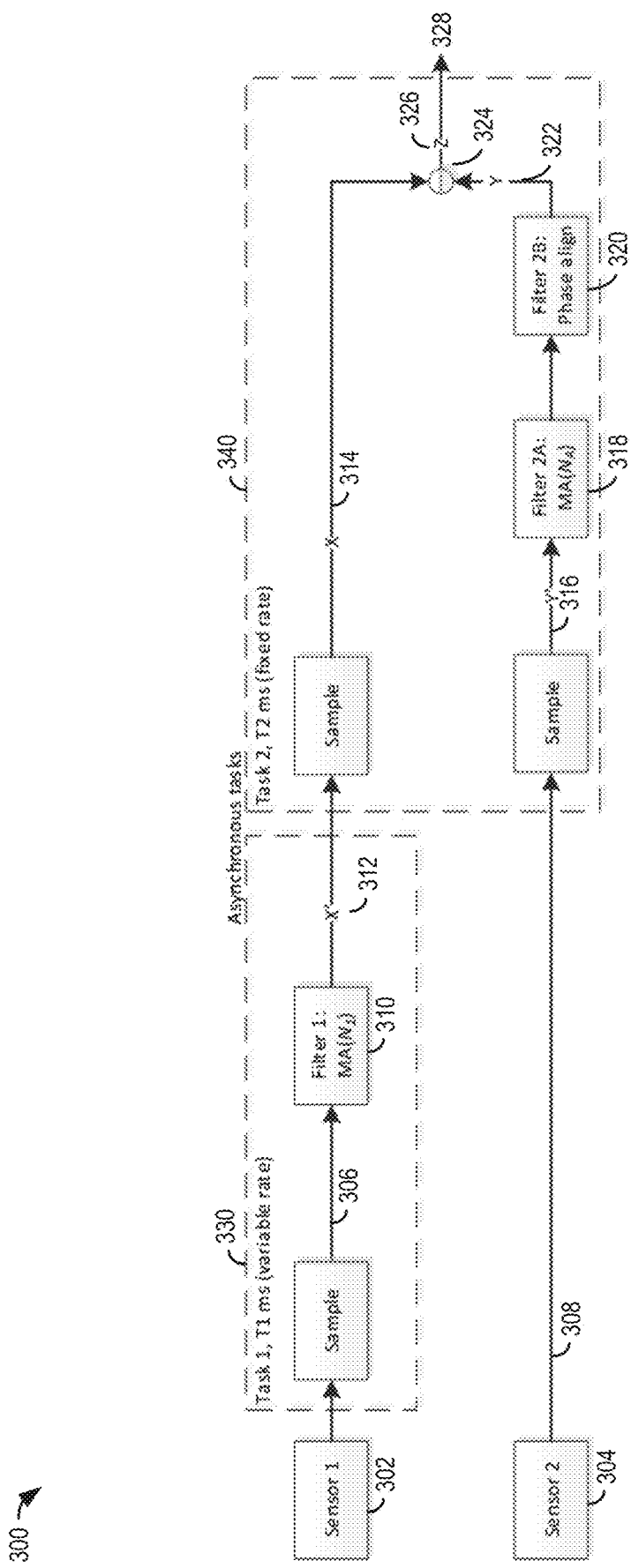
FIG. 3 shows an engine signal that is filtered according to the present description.
Figure 4:
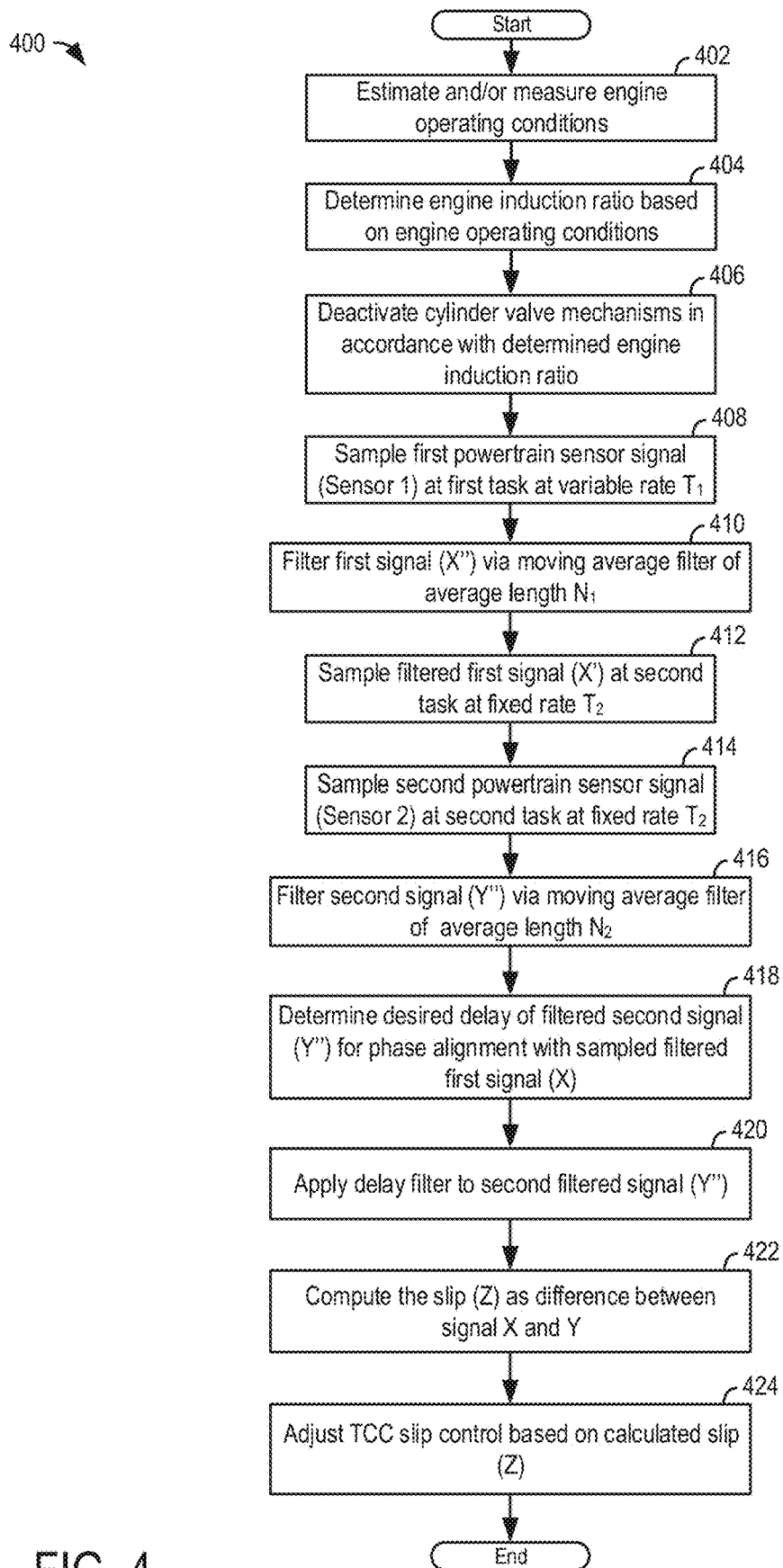
FIG. 4 shows a flow chart of a method to filter engine signals.

The present description is related to filtering signals from an engine and controlling the engine responsive to the filtered signals. An engine that includes cylinders that may be selectively deactivated is shown in FIG. 1. FIGS. 2A and 2B show example configurations for the engine described in FIG. 1. FIG. 3 shows an example sequence wherein two different raw powertrain (e.g., engine and transmission) sensor signals having harmonics from a change in engine induction ratio are filtered to remove the harmonics while aligning the phases of the signals. An example method that may be executed by an engine controller is shown at FIG. 4. The method processes raw powertrain sensor signals to suppress VDE harmonics and improve phase alignment between the signals. An example processing of signals during torque converter slip control is shown at FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. In the depicted example, engine 10 is coupled in a propulsion system, such as an on-road vehicle 5.

Combustion chamber 30 is shown communicating with intake manifold 44 and exhaust manifold 48 via respective intake valve 52 and exhaust valve 54. Exhaust valve 54 may be operated by a variable exhaust valve operator 53, which may be actuated mechanically, electrically, hydraulically, or by a combination of the same. For example, the exhaust valve actuators may be of the type described in U.S. Patent Publication 2014/0303873 and U.S. Pat. Nos. 6,321,704; 6,273,039; and 7,458,345, which are hereby fully incorporated for all intents and purposes. Exhaust valve 54 may be held closed during an entire engine cycle via variable exhaust valve operator 53. Further, exhaust valve operator 53 may open exhaust 54 valves synchronously or asynchronously with crankshaft 40. The position of exhaust valve 54 may be determined by exhaust valve position sensor 57. Intake valve 52 is opened and closed via intake valve operator 51, which may be of the same type as exhaust valve operator 53. The position of intake valve 52 may be determined by intake valve position sensor 59. Intake valve 52 may be held closed during an entire engine cycle via variable intake valve actuator 51 to deactivate an engine cylinder (e.g., no combustion occurs in the cylinder for at least an engine cycle when a cylinder is deactivated). In one example, intake valve 52 and exhaust valve 54 are held closed and fuel is not injected to cylinder 30 when cylinder 30 is deactivated. Other engine cylinders may be activated while cylinder 30 is deactivated.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; a turbocharger wastegate position sensor 156 (when present), alternatively sensor 156 may be an exhaust pressure sensor that may be position in an exhaust manifold; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. User interface 155, which may be referred to as a display or panel, allows vehicle occupants to request vehicle mode (e.g., economy/standard) and receive requests or diagnostic information from controller 12.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 5 may be a hybrid vehicle with multiple sources of torque available to one or more vehicle wheels 157. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 157 when one or more clutches 156 are engaged. In the depicted example, a first clutch 156*a* is provided between crankshaft 40 and electric machine 152. Additional clutches 156*b*, 156*c* are provided between electric machine 152 and transmission 154. Controller 12 may send a signal to an actuator of each clutch 156*a-c* to engage or disengage the clutch, so as to connect or disconnect crankshaft 140 from electric machine 152 and the components connected thereto, and/or connect or disconnect electric machine 152 from transmission 154 and the components connected thereto. For example, one of clutches 156*a-c* may be a forward clutch which when engaged propels vehicle 5. Transmission 154 may be a gearbox, a planetary gear system, or another type of transmission. The powertrain may be configured in various manners including as a parallel, a series, or a series-parallel hybrid vehicle. In one example, transmission 154 is an automatic transmission. Transmission 154 may also include a plurality of gear clutches (not shown) that may be engaged as needed to activate a plurality of fixed transmission gear ratios. Specifically, by adjusting the engagement of the plurality of gear clutches, the transmission may be shifted between a higher gear (that is, a gear with a higher gear ratio) and a lower gear (that is, a gear with a lower gear ratio). As such, in the higher gear ratio, a lower torque multiplication may be achieved across the transmission while in the lower gear ratio, a higher torque multiplication may be achieved across the transmission.

An engine output torque may be transmitted to torque converter (TC) 153 to drive transmission 154. In one example, the torque converter 153 may be referred to as a component of the transmission 154. The torque output of the torque converter may be controlled by a torque converter lock-up clutch. For example, one of clutches 156*b*, 156*c* may be torque converter lock-up clutch (TCC). When the torque converter lock-up clutch is fully disengaged, torque converter 153 transmits engine torque to transmission 154 via fluid transfer between the torque converter turbine and torque converter impeller, thereby enabling torque multiplication. In contrast, when the torque converter lock-up clutch is fully engaged, the engine output torque is directly transferred via the torque converter clutch to an input shaft (not shown) of transmission 154. Alternatively, the torque converter lock-up clutch may be partially engaged (or slipped), thereby enabling the amount of torque relayed to the transmission to be adjusted. In some examples, the engine system may include a speed or torque sensor coupled to the torque converter, such as coupled to the torque converter turbine, to estimate the turbine speed and/or the torque output of the torque converter. Controller 12 may be configured to adjust the amount of torque transmitted by torque converter 153 by adjusting the amount of slip at the torque converter lock-up clutch in response to various engine operating conditions, or based on a driver-based engine operation request. Torque output from the transmission 154 is then relayed to wheels 157 to propel the vehicle 5.

As elaborated herein at FIGS. 3-4, during torque converter slip control, the controller may process signals received from at least an engine speed sensor and a torque converter turbine speed sensor. As such, both signals have a frequency content that generates undesired harmonics that contribute to overall vehicle NVH. The controller may process the raw version of one of the received signals with a moving average filtered version of the other of the received signals in a manner so as to reduce the harmonics. In addition, since the signals are sampled asynchronously, the controller may process the signals to align the phases based on the actual delay between the signals via use of a low pass filter. By aligning the phases of the signals, the difference between the signals, i.e. the slip, will not be distorted by the engine harmonics. After phase-alignment, therefore, the calculated slip signal will be a more accurate value of the actual slip, which allows for better control performance. Improved regulation of the desired level of slip reduces NVH and opens up the possibility of using more efficient induction ratios because the allowable set of induction ratios are limited by NVH constraints.

Electric machine 152 receives electrical power from a traction battery 158 to provide torque to vehicle wheels 155. Electric machine 152 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, the controller may vary the transmission gear (e.g., upshift or downshift the transmission gear) to adjust an amount of torque conveyed across the transmission and torque converter to vehicle wheels 155. As another example, the controller may adjust a degree of engagement of the torque converter lock-up clutch to vary an amount of slip across the torque converter.

Referring now to FIG. 2A, an example multi-cylinder engine that includes two cylinder banks is shown. The engine includes cylinders and associated components as shown in FIG. 1. Engine 10 includes eight cylinders 30. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 may be deactivated during an engine cycle (e.g., two revolutions for a four stroke engine) and may be deactivated for a plurality of engine cycles while engine speed and load are constant or very slightly. During a different engine cycle, a second fixed pattern of cylinders 1, 4, 6, and 7 may be deactivated. Further, other patterns of cylinders may be selectively deactivated based on vehicle operating conditions (e.g., engine speed and load). Additionally, engine cylinders may be deactivated such that a fixed pattern of cylinders is not deactivated over a plurality of engine cycles. Rather, cylinders that are deactivated may change from one engine cycle to the next engine cycle.

Each cylinder bank 202 and 204 includes variable valve actuators 53 for activating and deactivating intake valves. The variable valve actuators may be operated via camshafts 254. Intake valves are held in a closed position when deactivated. Further, each cylinder includes variable exhaust valve operators 53 for selectively activating and deactivating exhaust valves. An engine cylinder may be deactivated by ceasing fuel flow to the cylinder and holding its intake and exhaust valves closed over an entire engine cycle. An engine cylinder may be activated by starting to open and close exhaust valves and intake valves during a cycle of the engine while fuel is delivered to the cylinder. Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine.

Referring now to FIG. 2B, an example multi-cylinder engine 250 that includes one cylinder bank is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 250, which includes four cylinders 1-4. Cylinders of the single bank may be active or deactivated during a cycle of the engine. Cylinder bank 250 includes variable intake valve actuators 51 for operating intake valves. Further, each cylinder includes variable exhaust valve operators 53 for selectively activating and deactivating exhaust valves. The variable valve actuators may be operated via camshafts 254. An engine cylinder may be deactivated by ceasing fuel flow to the cylinder and holding its intake and exhaust valves closed over an entire engine cycle. The engine cylinder may be activated by starting to open and close exhaust valves and intake valves during a cycle of the engine while fuel is delivered to the cylinder.

The system of FIGS. 1-2B provides for a vehicle system, comprising: a powertrain including an engine coupled to a transmission via a torque converter, the engine selectively deactivatable engine cylinders; a lock-up clutch for adjusting a degree of torque transfer via the torque converter; an engine speed sensor; a torque converter turbine speed sensor; and a controller with computer readable instructions stored on non-transitory memory that when executed cause the controller to operate the engine at an induction ratio selected based on operator torque demand by deactivating a number of the selectively deactivatable engine cylinders; sample, at a first controller module, a raw engine speed signal via the engine speed sensor at a variable rate; sample, at a second controller module, a raw turbine speed signal via the turbine speed sensor at a fixed rate; filter, at the first controller module, the raw engine speed signal via a moving average filter having a parameter selected based on the induction ratio; filter, at the second controller module, the raw turbine speed signal via each of another moving average filter and a low-pass filter, both filters having parameters selected to provide a target phase difference between the filtered engine speed signal and the filtered turbine speed signal; and adjust a degree of slippage of the lock-up clutch as a function of an estimated delay between the filtered engine speed signal and the filtered turbine speed signal. In one example, the target phase difference is selected to provide phase alignment between the filtered engine speed signal and the filtered turbine speed signal. The controller may be configured to include further instructions that cause the controller to adjust the degree of slippage of the lock-up clutch based on the estimated delay by calculating a slip error of the torque converter lock-up clutch from target slip and regulating lock-up clutch torque capacity to minimize the slip error.

Turning now to FIG. 3, an illustrative example of a filtering process 300 used for phase alignment and reduction of signal harmonics is shown. The process 300 is shown as a block diagram. It will be appreciated that the process of FIG. 3 is also shown as a flowchart in FIG. 4. The filtering method may be triggered, in one example, during torque converter slip control responsive to a change in engine induction ratio.

In the depicted example, a first raw sensor signal 306 is sampled from a first powertrain sensor 302; and a second raw sensor signal 308 is sampled from a second powertrain sensor 304. In one example, first sensor 302 is an engine speed sensor and signal 306 is an engine speed signal, while second sensor 304 is a torque converter turbine speed sensor and signal 308 is a turbine speed signal. Other examples of powertrain sensors may include sensors coupled to a transmission. Both raw sensor signals may have harmonics from rVDE operation that are undesired and need to be filtered out to reduce vehicle NVH. The first sensor signal 306 is sampled at a first task (Task 1) 330 or module of the engine controller and runs at a variable rate $T_1$. The first task 330 filters out the harmonics of the first raw sensor signal 306 by applying a first moving average filter 310, also depicted as $MA(N_1)$. The first moving average filter 310 has a moving average of length $N_1$ that varies with operating conditions.

The moving average length $N_1$ is chosen such that the moving average length times the variable rate $T_1$ is a multiple of the period of the undesirable harmonics, the moving average length representative of a number of samples over which the sample values are averaged. For this example, the variable rate for this example is determined by the engine speed and the period of the undesired oscillation is determined by the engine speed and the induction ratio. Furthermore, the moving average length can be chosen as the ratio between the undesired oscillation period and the variable rate because engine speed affects both the variable rate and the undesired oscillation period in the same way. For example, if the variable rate $T_1$ currently is 5 ms and the period of the undesired oscillation is 30 ms, an average window of length 6 samples is appropriate. The second sensor signal 308 is sampled at a second task (Task 12) 340 or module of the engine controller and runs at a fixed rate $T_2$. In one example, the fixed rate $T_2$ is larger than the variable rate $T_1$. The second task 340, after sampling the second sensor signal, calculates a difference 326 (represented as Z) between the two sensor signals. In one example, the signals are processed to compute a torque converter slip signal for feedback regulation. In other examples, the same signal processing method may be applied for other control applications such as torque converter speed ratio (ratio of turbine speed to engine speed), predicted engine speed (actual torque converter slip plus delta) and engine acceleration (engine speed time derivative).

A moving average filter of length N, denoted by MA(N), may be determined as:

$$y_k = \frac{1}{N} \sum_{l=0}^{N-1} u_{k-l}$$

where $u_k$ is the input signal at sample k. The length of the filter is selected for the appropriate suppression characteristics. The (phase) delay (in samples) for this filter is then determined as:

$$\sum_{k=0}^{N-1} \frac{k}{N} = \frac{N-1}{2}.$$

To calibrate the delay between the sensed signals, a new filter is created and applied that is a mix of the output of the moving average filter described above and a one-step delayed output of the same filter, determined as:

$$\tilde{y}_k = (1-r) y_k + r y_{k-1}$$

where $0 \leq r < 1$ denotes the proportion. The delay (in seconds) for the filter mix is then determined approximately as:

$$T_s \left( \frac{N-1}{2} + r \right)$$

where $T_s$ is the sample time (in seconds). The mix proportion r can be selected for a desired total delay $\tau$ (in seconds), so as to align the phases of the two asynchronous signal samples as:

$$r = \frac{\tau}{T_s} - \frac{N-1}{2}.$$

As elaborated below, in the method of FIG. 3, the filtered first sensor signal 312 (also depicted as X') from Task 1 (330) and the raw second sensor signal 308 are first sampled. Furthermore, the raw second sensor signal (also depicted as Y") is passed through the filters described below to achieve both suppression of rVDE harmonics and phase alignment between the signals.

In a first step, the controller determines parameters for the first moving average filter 310 applied at the first task for processing a raw sensor signal 306 from the first sensor 302, as well as parameters for a second moving average filter 318 ($MA(N_A)$) applied at the second task for processing a raw sensor signal 308 from the second sensor 304.

For the first filter 310 (Filter 1), operating at the variable sample rate $T_1$, a moving average of length $N_1$ is chosen to suppress the unwanted harmonics. Length $N_1$ is selected based on the period of the induction ratio counted as a multiple of the variable rate $T_1$. To achieve the same filter characteristics, to the extent possible, the length of the second moving average filter 318 (Filter 2A), operating at the fixed sample rate $T_2$, is chosen to equal the length of Filter 1 as measured in time (as opposed to samples). Thus what is desired is:

$$N_1 T_1 = N_A T_2$$

As such, this may not always be possible. This is because, firstly, $N_1$ must be an integer. This issue is addressed by selecting:

$$N_A = \left\lfloor \frac{T_1}{T_2} N_1 \right\rfloor$$

and interpolating the output between filters designed with length $N_A$ and $N_A+1$, respectively. Secondly, $N_1$ must at least be 1. Thus, if $N_1 T_1 < T_2$, the controller choose $N_A = 1$.

As a second step, the controller determines a desired delay between the signals to align the phases. To compute the difference 326 (or Signal Z) accurately, it may be desired that the delays of X and Y (from the respective source sensor signal) are equalized. From the process 300, it is then seen that this implies that that the total delay, $\tau$, for Filter 2A and Filter 2B should match the delay of signal X'. The total delay $\tau$ comes from Filter 2A, which is $0.5(N_A-1)T_2$, plus the delay from Filter 2B, which is $rT_2$. The delay of X' comes from the sample operation, which can be taken as $0.5T_1$, plus the delay of Filter 1, which is $0.5(N_1-1)T_1$.

In summary, the total delay can be depicted as:

$$\tau = \left( \frac{N_1 - 1}{2} + \frac{1}{2} \right) T_1 = \left( \frac{N_A - 1}{2} + r \right) T_2$$

which is further simplified to:

$$\tau = \frac{N_1}{2} T_1 = \frac{N_A}{2} T_2 - \left( \frac{1}{2} - r \right) T_2.$$

As the next step, the controller determines parameters for a second filter 320 (Filter 2B) that aligns the phases. In one example, the second filter may be a low pass filter. In particular, with the requirement on the length of Filter 2A, the expression for desired total delay can be rewritten as:

$$\tau = \frac{N_1}{2}T_1 = \frac{1}{2}\left\lfloor\frac{T_1}{T_2}N_1\right\rfloor T_2 - \left(\frac{1}{2} - r\right)T_2$$

which is equivalent to, as the mix proportion:

$$r = \frac{1}{2}\left(\frac{T_1}{T_2}N_1 - \left\lfloor\frac{T_1}{T_2}N_1\right\rfloor + 1\right)$$

For cases where $N_1 T_1 < T_2$, the controller can then compute r for $N_A = 1$ or select $r=0$. Note that r need not be a constant and may, in general, vary with filter lengths and rates. For example, if the variable rate $T_1$ currently is 5 ms and the period of the undesired oscillation is 30 ms, the first average window $N_1$ is 6. If $T_2$ is 10 ms, the second average window $N_2$ is 3 and the resulting r is 0.5. In another example, if the variable rate $T_1$ currently is 5 ms and the period of the undesired oscillation is 25 ms, the first average window $N_1$ is 5. If $T_2$ is 10 ms, the second average window $N_2$ is 3 and the resulting r is 0.75.

As a final next step, a cascade filter is implemented. In particular, at the second task 340, the total filter, which is a combination of Filter 2A and Filter 2B in cascade, becomes:

$$y_k = \frac{1}{N_A}\left((1-r)u_k + \sum_{l=1}^{N_A-1} u_{k-l} + r u_{k-N_A}\right)$$

where it should be noted that $N_A$ and r may be changing in general due to changes in the variable rate $T_1$ and variable length $N_1$ of Filter 1. As a result of the filtering, an output 328 is generated which is then applied as feedback for engine slip control.

In this way, the signal processing achieves two goals. Firstly, suppression of the engine harmonics that are determined by the induction ratio of the VDE. Secondly, phase alignment of the two signals emanating from systems with different task rates. Operations on these signals can now be made without introducing noise due to engine harmonics of signal misalignment. For example, the output 328, the difference between engine speed and turbine speed, is now a more accurate representation of the actual TCC slip. This difference is fed to a feedback regulator that strives to maintain the slip at a desired level. Additional parameters in the control strategy may be adjusted based on output 328. Examples include torque ratio and K-factor of the torque converter, feed-forward torque converter slip control, and compensation for inertia torque effects during lock-up clutch engagement.

Turning now to FIG. 4, an example method for operating an engine is shown wherein the filtered output of a powertrain sensor is combined with a raw signal of another powertrain sensor so as to reduce the harmonics of the individual sensor signals while also phase aligning the signals. The phase aligned signals can then be used to control an engine operating parameter, such as torque converter slip control and/or engine fueling. In one example, the method of FIG. 4 represents the block diagram of FIG. 3. Adjusting the moving average lengths $N_1$ and $N_A$ and the mix proportion r of the filters as a function of the engine induction ratio of a variable displacement engine enables suppression of the engine harmonics, driven by the induction ratio, and correction of phase misalignment, driven by different task rates. The method of FIG. 4 may be incorporated into and may cooperate with the system of FIGS. 1-2B. Further, at least portions of the method of FIG. 4 may be incorporated as executable instructions stored in non-transitory memory while other portions of the method may be performed via a controller transforming operating states of devices and actuators in the physical world. The vehicle's engine is rotating and combusting air and fuel in at least one cylinder while method 400 is active. Instructions for carrying out method 400 and the rest of the methods included herein may be executed by a controller based on instructions stored on a memory of the controller and in conjunction with signals received from sensors of the engine system, such as the sensors described above with reference to FIGS. 1-2B. The controller may employ engine actuators of the engine system to adjust engine operation, according to the methods described below.

At 402, the method includes estimating and/or measuring engine operating conditions. These may include, for example, engine speed, vehicle speed, operator torque demand, manifold pressure, manifold flow, boost pressure, ambient conditions (e.g., ambient humidity, pressure, temperature), etc.

At 404, the method includes determining a target engine induction ratio based on the estimated operating conditions. The induction ratio may be determined as the ratio of active cylinders to total number of cylinders. Thus, an induction ratio of 1.0 implies that all cylinders are desired to be active while an induction ratio of 0.5 implies that half of all cylinders are desired to be active. The controller may refer to a look-up table that outputs the target induction ratio as a function of at least engine speed and load as inputs. In one example, as the engine speed and load decreases, the target induction ratio decreases, although the relationship may not be linear.

In some examples, in addition to determining the target induction ratio, the controller may also output an identity and number of cylinders to deactivate. The selection may be based on current engine operating conditions, cylinder firing order, identity of cylinders previously deactivated on the current or the previous drive cycle, etc.

At 406, one or more cylinder valve mechanisms may be deactivated in accordance with the determined engine induction ratio, such as the based on the selected identity, number, and sequence of cylinder deactivation. For example, when the target induction ratio is 1.0, the controller may maintain all engine cylinders active and no cylinder valve mechanisms are deactivated. The engine may then operate with all cylinders firing. If the target induction ratio is less than 1.0, cylinder deactivation is requested, and cylinders may be deactivated in accordance with the number and identity of cylinders identified at 404. Alternatively, the number of cylinders to be selectively deactivated may be determined based on the target induction ratio while the identity of the cylinders to deactivate may be based on cylinder deactivation history and cylinder firing order. For example, if the induction ratio is 0.5, and the engine is a V-engine with 2 banks of cylinders, then the controller may selectively deactivate cylinders of the bank that was not deactivated on a last VDE event (that is, cylinders that remained active on the last VDE event). Selectively deactivating the selected cylinders includes the controller sending a control signal to corresponding cylinder fuel injectors to deactivate fueling. In addition, the controller may send a control signal to corresponding cylinder valve actuators (or cylinder valve deactivation mechanism actuators) to deactivate the intake and the exhaust valve of the cylinders. As a result, the exhaust valve is commanded to stay closed during an exhaust stroke of the deactivated cylinder.

At 408, the method includes sample a first powertrain sensor signal (Sensor 1) at a first task or module of the engine controller. The first powertrain sensor signal is sampled at a variable rate $T_1$. As one example, the first powertrain sensor signal is engine position sensor, sensed via a sensor such as sensor 118 of FIG. 1, sampled at a constant angular distance, which means variable time rate tied to engine cycle frequency, from which engine speed (RPM) is determined.

At 410, the method includes filtering the first signal X" at the first task or module via a moving average (MA) filter of average length $N_1$. The length $N_1$ of the MA filter is selected to suppress unwanted harmonics. The filtered first signal is hereafter represented as X'. The MA length $N_1$ is chosen equal to a multiple of the period of the unwanted harmonics, determined by the induction ratio of the VDE. For example, if the current induction ratio is 0.25 the firing pattern will repeat every fourth cylinder event and the average length is chosen to cover four cylinder events or an integer multiple thereof.

At 412, the method includes sampling the filtered first signal (X') at a second task or module of the powertrain controller at a fixed rate T2. In one example, the second task rate T2 is greater than the first task rate T1.

At 414, the method includes sampling a second powertrain sensor signal (Y) at a second task or module of the engine controller at a fixed rate $T_2$. In one example, the second powertrain sensor signal is torque converter output shaft speed, sensed via a speed sensor (such as bi-directional hall effect turbine speed sensor located at 156c of FIG. 1 sensing the output shaft speed of the TC 153 in FIG. 1) at a fixed rate of 10 ms.

At 416, the method includes filtering the second signal (Y") at the second task or module via a moving average (MA) filter of average length $N_A$. The length $N_A$ of the MA filter is selected to give filter characteristics similar as the first filter, to suppress unwanted harmonics, with the consideration of the different task rates. In one example, this includes choosing the length $N_A$ such that the product between $N_A$ and the second task rate T2 is as close as possible to the product of the first filter length N1 and the first task rate T1. For example, if N1 is 8, T1 is 5 ms, and T2 is 10 ms, the length $N_A$ is chosen to 4.

At 418, the method determines the desired delay of filtered second signal (Y'). In one example, it may be desired to make the total delay τ from the second task module, including the delay from a first moving average filter and a second, phase alignment filter, to set to match of the first filtered signal (X') in the first task module. This total delay may be estimated as the sum of the delays due to sampling and filtering operations in the first task module. The sampling delay in the first task module may be estimated as half the task rate T1 and the filtering delay in the first task module may be estimated as the average delay of the filter inputs. For example, if the task rate T1 is 5 ms and filter 1 averaging length N1 is 4 then the sample delay is 2.5 ms and the filter delay is 7.5 ms.

At 420, the method includes applying the phase align filter to the second filtered signal (Y') to align phases. This includes taking a weighted average of the current value of Y' and the previous value of Y'. The weighting factor is determined by the lengths (N1,$N_A$) of the moving average filters and the task rates (T1 and T2) to achieve the desired phase alignment delay.

At 422, the method includes computing the TCC slip as the difference between signal X and signal Y. The difference is hereafter represented as Z.

At 424, the method includes adjusting one or more powertrain operating parameters based on the filtered sensor signals. In one example, where the first signal is engine speed and the second signal is turbine speed, an amount of torque converter slip may be controlled based on the difference of the signals (Z). This includes torque converter speed ratio, predicted engine speed and engine acceleration. For example, the torque converter speed ratio, which is the ratio of the turbine speed to the engine speed, is typically used to characterize the torque ratio and K-factor of the converter and is used for feed-forward torque converter slip control. As another example, predicted engine speed, which can be calculated as the current torque converter slip plus an expected amount of slip, can be used for feed-forward torque converter slip control. As yet another example, the engine acceleration, which can be calculated as the discrete time derivative of the filtered engine speed, can be used to estimate and compensate for inertia torque effects during lock-up clutch engagement. The method then exits.

In this way, torque converter slip control can be provided while reducing engine harmonics using a simple low pass filter, and without requiring complex filters and other signal processors. Deactivating engine cylinders, i.e., using induction ratios less than one, when not needed to fulfill the torque demand often saves fuel. However, NVH may not be acceptable at any induction ratio. This may be mitigated by either avoiding those induction ratios, which reduces the potential for fuel savings, or increasing the desired TCC slip, which leads to energy losses and decreased fuel economy. Improved regulation of the TCC slip level is therefore advantageous to enable fuel-efficient induction ratios, which would otherwise be excluded, and to lower desired slip levels for any induction ratio, because less margin is needed with tighter regulation. The slip regulator, which uses the estimated actual slip, can perform better because the signal processing provides a more accurate estimate of the actual slip level without compromising the dynamic signal response.

Turning now to FIG. 5, map 500 shows an example of torque converter slip control based on a first engine speed signal and a second torque converter turbine speed signal, with and without compensation using the phase alignment method of FIG. 4. In the depicted example, the signals are processed to control torque converter slip to provide a substantially constant slip condition of about 40 rpm.

Map 500 depicts a first powertrain sensor signal, herein engine speed signal, at plot 502. In particular, plot 502 depicts a raw, unprocessed engine speed signal from an engine speed sensor. After filtering the engine speed signal via a simple, low pass filter, a first filtered engine speed sensor signal is attained, depicted at plot 504.

Plot 506 depicts a raw, unprocessed torque converter turbine speed signal from a torque converter speed or torque sensor. After filtering the turbine speed signal via a simple, low pass filter, a first filtered turbine speed sensor signal is attained, depicted at plot 508. Further processing of the first filtered turbine speed signal via a moving average filter and a phase alignment filter results in a second filtered turbine speed signal, depicted at plot 510. This second filtered turbine speed signal has harmonics of the signal removed and also has a phase of the turbine speed signal aligned to match the phase of the filtered engine speed signal, in accordance with the method of FIGS. 3-4.

Plot 512 depicts torque converter slip control as a function of the filtered engine speed signal and the first filtered turbine speed signal (which has been processed via a low pass filter only, in accordance with the prior art methods). Plot 514 depicts torque converter slip control as a function of the filtered engine speed signal and the second filtered turbine speed signal (which has been processed to reduce harmonics and align phases, in accordance with the methods disclosed herein).

As shown, plot 514 exhibits lower standard deviation from the true mean torque converter slip when compared to plot 512. A lower standard deviation results in less effort from the slip regulator and allows the slip target to be closer to the minimum slip required for NVH isolation. With the higher standard deviation shown in plot 512, the system cannot reliably detect that the minimum slip required for NVH isolation is achieved and therefore either more margin is required by raising the slip target above the minimum required level or less NVH isolation is required by changing the induction to a level that produces less NVH, both of which reduce the total system operating efficiency.

In this way, undesired VDE engine harmonics (especially in a rolling VDE engine) can be reduced from an powertrain sensor signal while tuning the phase delay of the signal to match another powertrain sensor signal filtered at another, in general asynchronous, task rate. For example, in the case of torque converter slip regulation, the technical effect of aligning the phases of an engine speed signal and a torque converter turbine speed signal is that the quality of the feedback signal, which is the difference between the engine speed and torque converter turbine speed, is improved, giving an opportunity for increased controller bandwidth and thereby better control performance. Further, simpler low-pass filtering approaches can be used to align the phases and reduce the signal harmonics sufficiently for any engine induction ratio. Overall, dynamic signal response and maximum regulation bandwidth is improved. By improving torque converter slip control, vehicle performance and fuel economy is improved.

One example method comprises: while operating an engine with one or more cylinders deactivated, calculating torque converter lock-up clutch (TCC) slip by filtering a plurality of powertrain input signals using filter parameters adjusted based on a current induction ratio to align a phase of the plurality of input signals. In the preceding example, additionally or optionally, the plurality of powertrain input signals are sampled asynchronously at a controller. In any or all of the preceding examples, additionally or optionally, the plurality of powertrain input signals include a first powertrain input signal sampled at a variable rate based on engine operating conditions and a second powertrain input signal sampled at a fixed rate. In any or all of the preceding examples, additionally or optionally, the filtering includes filtering the first powertrain input signal via a first moving average filter, a length of the first moving average filter based on the current induction ratio. In any or all of the preceding examples, additionally or optionally, the filtering further includes filtering the second powertrain input signal via a cascade filter, the cascade filter including a second moving average filter followed by a low-pass filter, a length of the second moving average filter and a passband of the low-pass filter based on the current induction ratio. In any or all of the preceding examples, additionally or optionally, the method further comprises estimating an actual delay between the filtered first input signal and the second input signal, unfiltered; selecting a target delay based on the current induction ratio and the actual delay; and adjusting filter parameters of the cascade filter to transition from the actual delay to the target delay. In any or all of the preceding examples, additionally or optionally, the first powertrain input signal is an engine speed signal sensed via an engine speed sensor coupled to an engine crankshaft, and wherein the second powertrain input signal is a torque converter turbine speed sensed via a speed sensor coupled to a torque converter, the torque converter coupled between the engine and a transmission. In any or all of the preceding examples, additionally or optionally, the filtering of the first powertrain input signal via the first moving average filter reduces a harmonic content of the first powertrain input signal, wherein the filtering of the second powertrain input signal via the second moving average filter reduces the harmonic content of the second powertrain input signal, and wherein the filtering of the second powertrain input signal via the low-pass filter aligns a phase of the first filtered powertrain input signal with the phase of the second filtered powertrain input signal. In any or all of the preceding examples, additionally or optionally, the calculating includes filtering a first powertrain input signal related to TCC slip control, combining the filtered first input signal with an unfiltered second powertrain input signal related to TCC slip control, and processing the first and second signal with a delay adjusted based on an induction ratio to align a phase of the first and second input signals. In any or all of the preceding examples, additionally or optionally, the method further comprises adjusting a degree of engagement of the TCC based on the calculated slip.

Another example method for a powertrain of a vehicle comprises: selectively deactivating one or more engine cylinders to operate an engine with an induction ratio; filtering a first input signal related to a powertrain operating parameter with a filter characteristic selected based on the induction ratio; estimating an actual delay between the filtered first input signal and an unfiltered second input signal related to the powertrain operating parameter, the first input signal sampled asynchronous to the second input signal; and then filtering the second signal to provide a target delay between the filtered first input signal and the filtered second input signal. In any or all of the preceding examples, additionally or optionally, the target delay is selected to align a phase of the filtered first input signal with the phase of the filtered second input signal. In any or all of the preceding examples, additionally or optionally, the method further comprises adjusting the powertrain operating parameter based on the target delay, the powertrain operating parameter including an engine operating parameter and/or a transmission operating parameter. In any or all of the preceding examples, additionally or optionally, the powertrain operating parameter includes an amount of slip of a torque converter lock-up clutch coupled to a torque converter, the torque converting coupling the engine to a transmission of the powertrain, wherein the first powertrain input signal is an engine speed, and the second powertrain input signal is a torque converter turbine speed. In any or all of the preceding examples, additionally or optionally, the method further comprises sampling the first input signal from a first sensor at a variable rate at a first module of an engine controller; and sampling the second input signal from a second sensor at a fixed rate at a second, different module of the engine controller, a phase of the first input signal misaligned relative to the phase of the second input signal. In any or all of the preceding examples, additionally or optionally, filtering the first input signal includes filtering via a first moving average filter having a first length based on the induction ratio. In any or all of the preceding examples, additionally or optionally, the filtering the second signal includes first filtering the second input signal via a second moving average filter having a second length based on the induction ratio; and then filtering via the moving average filtered second input signal via a phase alignment filter to provide the target delay.

Another example vehicle system, comprises: a powertrain including an engine coupled to a transmission via a torque converter, the engine including selectively deactivatable engine cylinders; a lock-up clutch for adjusting a degree of torque transfer via the torque converter; an engine speed sensor; a torque converter turbine speed sensor; and a controller with computer readable instructions stored on non-transitory memory that when executed cause the controller to operate the engine at an induction ratio selected based on operator torque demand by deactivating a number of the selectively deactivatable engine cylinders; sample, at a first controller module, a raw engine speed signal via the engine speed sensor at a variable rate; sample, at a second controller module, a raw turbine speed signal via the turbine speed sensor at a fixed rate; filter, at the first controller module, the raw engine speed signal via a moving average filter having a parameter selected based on the induction ratio; filter, at the second controller module, the raw turbine speed signal via each of another moving average filter and a low-pass filter, both filters having parameters selected to provide a target phase difference between the filtered engine speed signal and the filtered turbine speed signal; and adjust a degree of slippage of the lock-up clutch as a function of an estimated delay between the filtered engine speed signal and the filtered turbine speed signal. In any or all of the preceding examples, additionally or optionally, the target phase difference is selected to provide phase alignment between the filtered engine speed signal and the filtered turbine speed signal. In any or all of the preceding examples, additionally or optionally, the controller includes instructions that cause the controller to adjust the degree of slippage of the lock-up clutch based on the estimated delay by calculating a slip error of the torque converter lock-up clutch from target slip and regulating lock-up clutch torque capacity to minimize the slip error.

In another representation, the vehicle is a hybrid vehicle system and/or an autonomous vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while operating an engine with one or more cylinders deactivated,
   calculating torque converter lock-up clutch (TCC) slip by filtering a plurality of powertrain input signals using filter parameters adjusted based on a current induction ratio to align a phase of the plurality of input signals.

2. The method of claim 1, wherein the plurality of powertrain input signals are sampled asynchronously at a controller.

3. The method of claim 1, wherein the plurality of powertrain input signals include a first powertrain input signal sampled at a variable rate based on engine operating conditions and a second powertrain input signal sampled at a fixed rate.

4. The method of claim 3, wherein the filtering includes filtering the first powertrain input signal via a first moving average filter, a length of the first moving average filter based on the current induction ratio.

5. The method of claim 4, wherein the filtering further includes filtering the second powertrain input signal via a cascade filter, the cascade filter including a second moving average filter followed by a low-pass filter, a length of the second moving average filter and a passband of the low-pass filter based on the current induction ratio.

6. The method of claim 5, further comprising:
   estimating an actual delay between the filtered first input signal and the second input signal, unfiltered;
   selecting a target delay based on the current induction ratio and the actual delay; and
   adjusting filter parameters of the cascade filter to transition from the actual delay to the target delay.

7. The method of claim 5, wherein the first powertrain input signal is an engine speed signal sensed via an engine speed sensor coupled to an engine crankshaft, and wherein the second powertrain input signal is a torque converter turbine speed sensed via a speed sensor coupled to a torque converter, the torque converter coupled between the engine and a transmission.

8. The method of claim 5, wherein the filtering of the first powertrain input signal via the first moving average filter reduces a harmonic content of the first powertrain input signal, wherein the filtering of the second powertrain input signal via the second moving average filter reduces the harmonic content of the second powertrain input signal, and wherein the filtering of the second powertrain input signal via the low-pass filter aligns a phase of the first filtered powertrain input signal with the phase of the second filtered powertrain input signal.

9. The method of claim 1, wherein the calculating includes filtering a first powertrain input signal related to TCC slip control, combining the filtered first input signal with an unfiltered second powertrain input signal related to TCC slip control, and processing the first and second signal with a delay adjusted based on an induction ratio to align a phase of the first and second input signals.

10. The method of claim 1, further comprising, adjusting a degree of engagement of the TCC based on the calculated slip via an actuator coupled to the clutch.

11. A method for a powertrain of a vehicle, comprising:
selectively deactivating one or more engine cylinders to operate an engine with an induction ratio;
filtering a first input signal related to a powertrain operating parameter with a filter characteristic selected based on the induction ratio;
estimating an actual delay between the filtered first input signal and an unfiltered second input signal related to the powertrain operating parameter, the first input signal sampled asynchronous to the second input signal; and
then filtering the second signal to provide a target delay between the filtered first input signal and the filtered second input signal.

12. The method of claim 11, wherein the target delay is selected to align a phase of the filtered first input signal with the phase of the filtered second input signal.

13. The method of claim 11, further comprising, adjusting the powertrain operating parameter based on the target delay, the powertrain operating parameter including an engine operating parameter and/or a transmission operating parameter.

14. The method of claim 11, wherein the powertrain operating parameter includes an amount of slip of a torque converter lock-up clutch coupled to a torque converter, the torque converting coupling the engine to a transmission of the powertrain, wherein the first powertrain input signal is an engine speed, and the second powertrain input signal is a torque converter turbine speed.

15. The method of claim 11, further comprising:
sampling the first input signal from a first sensor at a variable rate at a first module of an engine controller; and
sampling the second input signal from a second sensor at a fixed rate at a second, different module of the engine controller, a phase of the first input signal misaligned relative to the phase of the second input signal.

16. The method of claim 11, wherein the filtering the first input signal includes filtering via a first moving average filter having a first length based on the induction ratio.

17. The method of claim 16, wherein the filtering the second signal includes:
first filtering the second input signal via a second moving average filter having a second length based on the induction ratio; and
then filtering via the moving average filtered second input signal via a phase alignment filter to provide the target delay.

18. A vehicle system, comprising:
a powertrain including an engine coupled to a transmission via a torque converter, the engine including selectively deactivatable engine cylinders;
a lock-up clutch for adjusting a degree of torque transfer via the torque converter;
an engine speed sensor;
a torque converter turbine speed sensor; and
a controller with computer readable instructions stored on non-transitory memory that when executed cause the controller to:
operate the engine at an induction ratio selected based on operator torque demand by deactivating a number of the selectively deactivatable engine cylinders;
sample, at a first controller module, a raw engine speed signal via the engine speed sensor at a variable rate;
sample, at a second controller module, a raw turbine speed signal via the turbine speed sensor at a fixed rate;
filter, at the first controller module, the raw engine speed signal via a moving average filter having a parameter selected based on the induction ratio;
filter, at the second controller module, the raw turbine speed signal via each of another moving average filter and a low-pass filter, both filters having parameters selected to provide a target phase difference between the filtered engine speed signal and the filtered turbine speed signal; and
adjust a degree of slippage of the lock-up clutch as a function of an estimated delay between the filtered engine speed signal and the filtered turbine speed signal.

19. The system of claim 18, wherein the target phase difference is selected to provide phase alignment between the filtered engine speed signal and the filtered turbine speed signal.

20. The system of claim 18, wherein the controller includes further instructions that cause the controller to adjust the degree of slippage of the lock-up clutch based on the estimated delay by calculating a slip error of the torque converter lock-up clutch from target slip and regulating lock-up clutch torque capacity to minimize the slip error.

* * * * *